United States Patent [19]

Seidl et al.

[11] 4,205,736
[45] Jun. 3, 1980

[54] CURRENT COLLECTOR ARRANGEMENT FOR A TROLLEY BUS

[75] Inventors: Ernst Seidl, Friedrichshafen; Gustav Sell, Immenstaad; Peter Wüch, Markdorf, all of Fed. Rep. of Germany

[73] Assignee: Dornier System GmbH, Friedrichshafen, Fed. Rep. of Germany

[21] Appl. No.: 966,809

[22] Filed: Dec. 6, 1978

[30] Foreign Application Priority Data

Jun. 22, 1978 [DE] Fed. Rep. of Germany ....... 2827371

[51] Int. Cl.² .............................................. B60L 5/16
[52] U.S. Cl. ...................................... 191/70; 191/60.2; 191/60.3; 191/83
[58] Field of Search .................. 191/60.2, 60.3, 68, 191/69, 70, 82, 83, 84

[56] References Cited

U.S. PATENT DOCUMENTS

| 917,714 | 4/1909 | Cooper | 191/83 |
| 932,426 | 8/1909 | Austin | 191/83 |

FOREIGN PATENT DOCUMENTS 2460843 5/1977 Fed. Rep. of Germany .
2604535 3/1978 Fed. Rep. of Germany .

Primary Examiner—Richard A. Schacher
Attorney, Agent, or Firm—Toren, McGeady and Stanger

[57] ABSTRACT

The contact pole of a trolley bus carries at its normally upper end a trolley shoe and an upwardly projecting guide which may jointly pivot on the pole about an approximately vertical axis. When the pole is partly raised by a heavy spring and swung horizontally, the trolley shoe is vertically aligned with an overhead wire when the guide abuts against the wire. When the pole is further raised by the spring, the trolley shoe engages the wire, and the guide is automatically dropped below the trolley shoe so as not to collide with hangers for the overhead wire. When the pole is lowered by an operating mechanism against the biasing force of the spring, a motor-driven element of the mechanism connected to the guide by a motion transmitting train automatically returns the guide to its position above the trolley shoe.

7 Claims, 4 Drawing Figures

CURRENT COLLECTOR ARRANGEMENT FOR A TROLLEY BUS

This invention relates to current collector arrangements for trackless trolley vehicles, and particularly to a current collector arrangement including a contact pole carrying a trolley shoe and capable of being pivoted on the supporting vehicle for movement of the trolley shoe toward and away from an overhead wire.

It is known from the commonly owned German Pat. Nos. 24 60 843 and 26 04 535 to equip the trolley shoe on such a contact pole with a guide that may be shifted between respective positions above and below the trolley shoe, and aligns the shoe vertically with the overhead wire to be engaged when the pole is swung horizontally until the guide in its upper position abuts against the wire. The trolley shoe thereafter is raised into current transmitting contact with the overhead wire, and the guide is shifted to its lower position in which it does not collide with hangers for the overhead wire during movement of the vehicle. Downward shifting of the guide is initiated automatically upon engagement of the trolley shoe with the wire.

It was still necessary in the earlier arrangements manually to return the guide to its position above the trolley shoe prior to the next raising of the trolley shoe to its position of contact with an overhead wire after the trolley shoe had been lowered. In trolley buses operating alternatively on sections of a route provided with overhead wires for current supply, and on sections not so equipped where the bus operates on built-in batteries, a guide raising procedure requiring the drive of the bus to leave his seat is undesirable, and it is an object of this invention to improve the current collector arrangement of the earlier devices in such a manner that the guide is not only shifted downward automatically after engagement of the associated trolley shoe with an overhead wire, but is also returned to its position above the trolley shoe when the latter is disengaged from the wire.

With this object and others in view, the invention in its more specific aspects relates to a current collector arrangement in which one longitudinally terminal portion of a pole is mounted on a support for movement about a horizontally extending axis. A trolley shoe mounted on the other longitudinally terminal portion of the pole may move angularly relative to the terminal pole portion about a first vertically extending axis and about a second, horizontally extending axis. A guide is secured to the trolley shoe for joint movement about the first axis and for movement relative to the trolley shoe about an axis approximately parallel to the second axis between respective positions above and below the trolley shoe. Cooperating abutments on the trolley shoe and on the guide initiate movement of the guide from the position above the trolley shoe to the position below the trolley shoe in response to a predetermined angular movement of the trolley shoe about the second axis. A spring arranged between the support and the pole biases the pole into upward pivotal movement of the shoe-carrying terminal portion away from the support. An operating mechanism is provided for lowering the terminal pole portion against the biasing force and includes a motor-driven operating member movable on the support. A motion-transmitting train connects the operating member to the guide and moves the same from its position below the trolley shoe to the position above the trolley shoe in response to lowering of the shoe-carrying terminal pole portion by the operating mechanism.

Other features, additional objects, and many of the attendant advantages of this invention will readily be appreciated as the same becomes better understood from the following detailed description of a preferred embodiment when considered in connection with the appended drawing in which.

Figure 1:
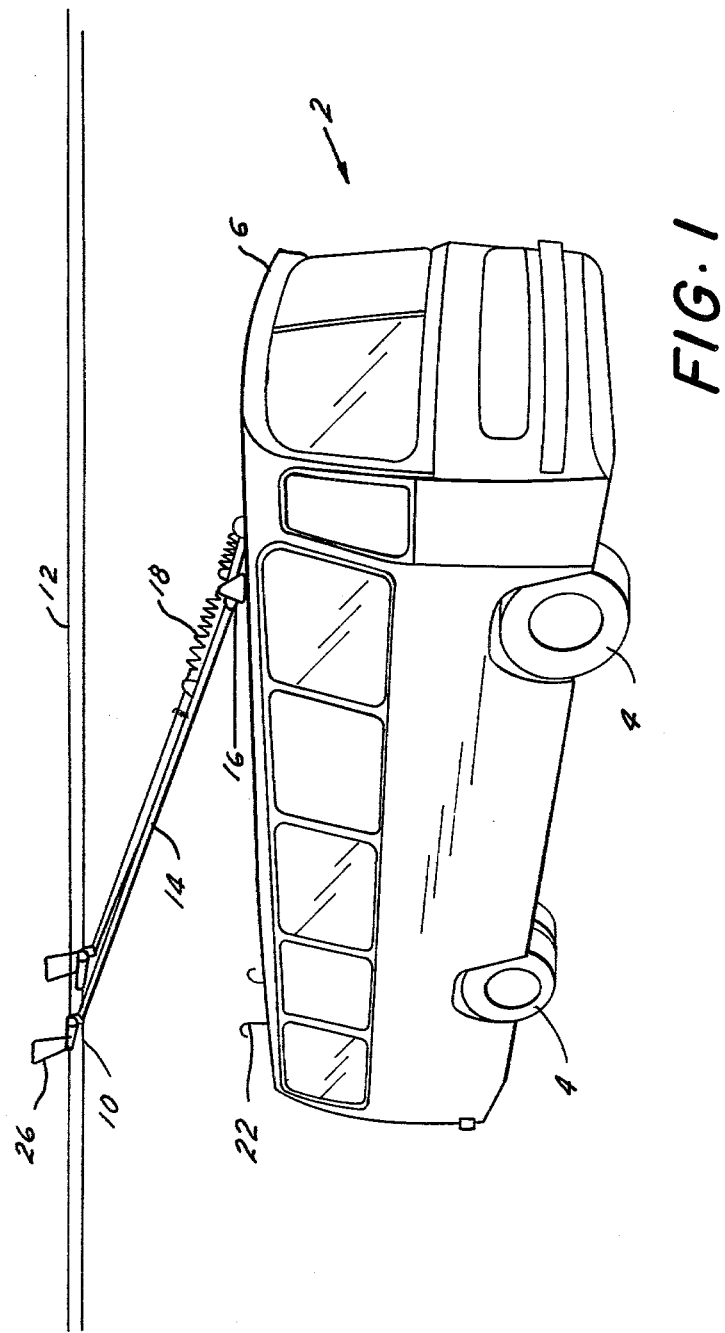
FIG. 1 shows a trolley bus equipped with two current collector arrangements of the invention in a perspective view.

Referring now to the drawing in detail, and initially to FIG. 1, there is shown a trolley bus 2 traveling on a non-illustrated road surface on rubber-tired wheels 4. Its roof 6 carries two identical current collectors 8 juxtaposed transversely to the direction of bus movement. Each current collector 8 includes a tubular pole 14 one end of which is attached to the roof 6 by a pivot shaft 16 for movement in a vertical plane, the other end carrying a grooved trolley shoe 10 for engagement with a current-carrying overhead wire 12 fixedly mounted above road level in a conventional manner, not shown. Each pole 14 is biased upward by a helical tension spring 18. Hooks 22 on the roof 6 may hold the poles 14 in the inoperative position, if so desired. Each pole shoe 10 is provided with a guide 26 to facilitate its engagement with a wire 12, as will presently be described in more detail.

Figure 2:
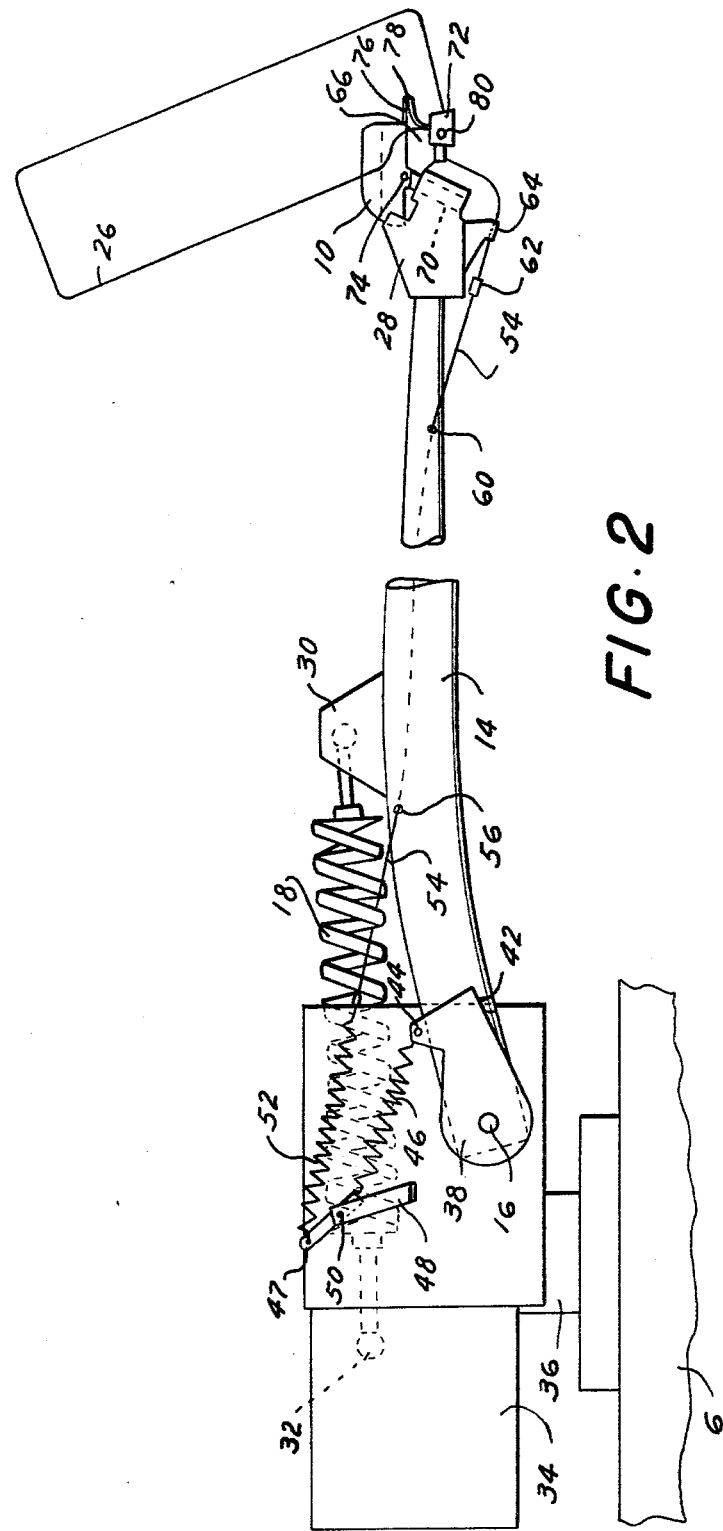
FIG. 2 illustrates one of the current collector arrangements of FIG. 1 in the retracted position in fragmentary side elevation.

One of the poles 14 and associated elements are shown in FIG. 2 on a larger scale in the inoperative condition in which the pole may be held near the roof 6 by one of the hooks 22, not itself seen in FIG. 2. The roof 6 carries an upright shaft 36 on which a motor housing 34 is mounted for angular movement in a generally horizontal plane. A servo motor concealed in the housing and engaging the shaft 36 is controlled by the driver of the bus in a manner not specifically shown. Another servo motor similarly controlled turns the pivot shaft 16 which projects horizontally from the housing 34 and rotatably carries the lower end of the tubular pole 14. The ends of the spring 18 are attached to a bracket 30 on the pole 14 and a pin 32 on the housing 34.

A bore in an enlarged head 28 on the normally upper end of the pole 14 rotatably receives an obliquely upright shaft 70. A tranverse pivot pin 74 attaches the pole shoe 10 to the shaft 70. A radial arm 66 on the shaft 70 carries a horizontal pivot pin 80, parallel to the pin 74, on which an insulating block 72 of the guide 26 is mounted. The illustrated guide consists of an approximately rectangular loop of wire closed by the block 72. The weight of the trolley shoe 10 is distributed about the horizontal axis of the pin 74 in such a manner that the shoe is biased by gravity counterclockwise, as viewed in FIG. 2, into abutting engagement with the head 28, and the weight distribution of the guide 26 relative to the pin 80 is analogous so that an abutment arm 76 on the shoe 10 is engaged by a similar arm 78 on the block 72.

A radial arm 38 is fixedly mounted on the shaft 16. It engages a stop 42 on the pole 14 and thereby prevents the pole from being turned counterclockwise from the position of FIG. 2 by the spring 18. A lug 44 of the arm 38 is connected by a helical tension spring 46 to one arm of a lever 47 mounted on the housing 34 by a bracket 48 and a pivot pin 50 on the bracket. Another helical tension spring 52 connects the other arm of the lever 47 with a bowden cable 54. The cable enters the bore of the pole 14 through an opening 56 near the lower end of the pole and emerges from the bore through an opening 60 near the upper pole end. It is further guided in a lug 64 on the pole head 28 and carries a stop 62 which limits movement of the cable outward of the opening 60 toward the lug 64. The free end of the cable 54 is attached to the block 72 and tends to turn the block and the guide 26 counterclockwise under the tension of the springs 46, 52.

When the arm 38 is turned counterclockwise from the position of FIG. 2 by the motor-driven shaft 16, the spring 18 raises the pole 14. Simultaneously, the springs 46, 52 are being relaxed. Gravity, however, keeps the guide 26 in the erected position. When the pole 14 is raised sufficiently to bring the guide 26 to the level of the wire 12, the pole is swung on the shaft 36 until the guide 26 abuts against the wire 12, whereby the groove in the shoe 10 is aligned with the wire 12, whereupon raising of the pole 14 is resumed.

Figure 3:
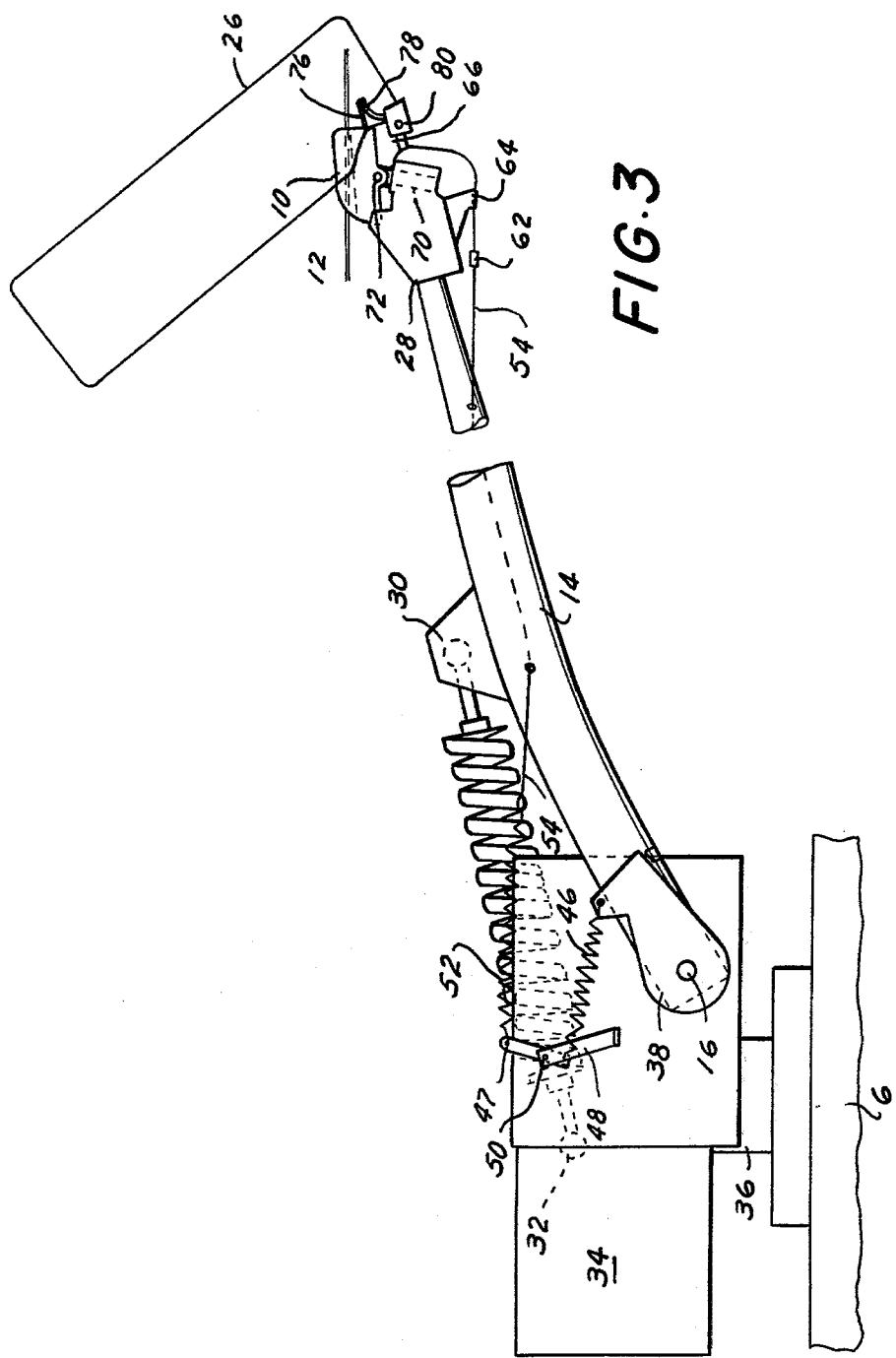
FIG. 3 shows the current collector arrangement of FIG. 2 approaching its operation position.

The pole shoe 10 tilts with the pole 14 so that the bottom of the groove in the shoe 10 makes initial contact with the wire 12 only at its highest point, as is shown in FIG. 3. Upon further raising of the pole 14, the shoe 10 is pivoted clockwise on the pin 74 by the engaged wire 12, and the abutment arm 76 on the pole shoe 10 swings the abutment arm 78 on the block 72 about the pin 80 until the center of gravity of the guide 26 is shifted sufficiently beyond the axis of the pin 80 to cause the guide 26 to pivot to a position below the wire 12 where it cannot collide with hangers supporting the wire 12 as the bus travels. The slack bowden cable 54 and the fully relaxed springs 52, 46, which connect it in a motion transmitting train with the arm 38, do not interfere with the dropping movement of the guide 26.

When the pole 14 is lowered by means of the arm 38 to disengage the pole shoe 10 from the wire 12, the springs 46, 52 are tensioned and the guide 26 is returned to the position shown in FIG. 2 by the cable 54 in which the guide 26 is ready to align the pole shoe 10 vertically with the wire 12 during subsequent raising and is protected against damage by collision with the roof 6.

A bus has been shown in the drawing as the vehicle on which the current collectors 8 are supported, but the invention may be used to advantage on other trackless trolley vehicles which alternatively operate on electric current supplied by overhead wires and built-in batteries, or which otherwise require their trolley shoes to be moved into and out of engagement with overhead conductors.

Figure 4:
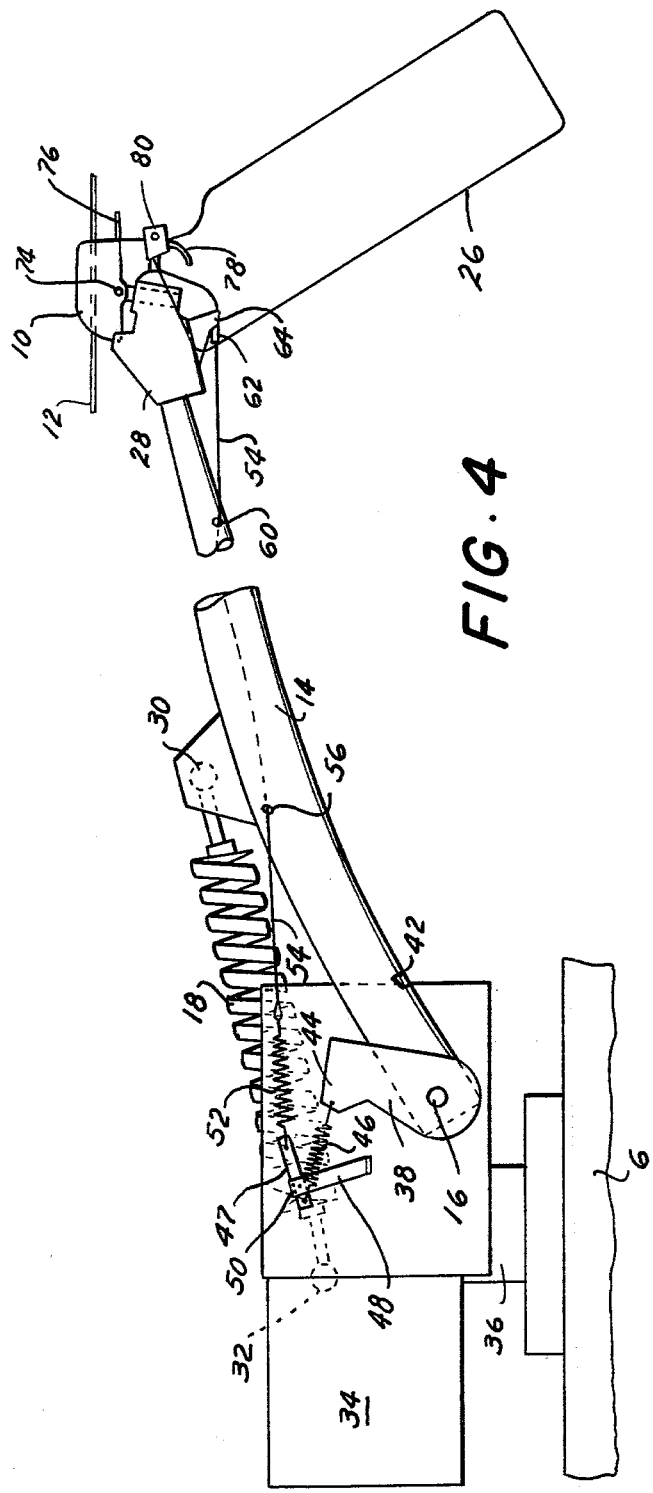
FIG. 4 shows the collector arrangement in the operative position.

The collector arrangement illustrated and described is preferred at this time, but is capable of variations and modifications which will readily suggest themselves to those skilled in the art. Thus, the pole shoe 10 and/or the guide 26 may be biased additionally by weak springs in a counterclockwise direction, as viewed in FIGS. 2 to 4. The bowden cable 54 may be replaced by a simple wire, cable or other tension member. One of the springs 46, 52 may be omitted, and either the cable 54 or the arm 38 may be connected with the lever 47 by a rigid element.

In the preferred embodiment, the cable 54 and the spring 52 are tandem-connected between the lever 47 and the block 72 in such a manner that the spring is directly attached to the lever, but other arrangements will produce the same effect. Mounting the spring in the bore of the pole 14 between two sections of the cable 54 is specifically contemplated.

It should be understood,, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. A current collector arrangement comprising:
   (a) a support;
   (b) a pole having one longitudinally terminal portion mounted on said support for movement about a horizontally extending pivot axis;
   (c) a trolley shoe mounted on the other longitudinally terminal portion of said pole for angular movement about a first vertically extending axis and for angular movement about a second horizontally extending axis relative to said other terminal portion;
   (d) a guide member secured to said trolley shoe for joint movement about said first axis and for movement relative to said trolley shoe about an axis substantially parallel to said second axis between respective positions above and below said trolley shoe;
   (e) cooperating abutment means on said trolley shoe and on said guide member for initiating movement of said guide member from said position thereof above said trolley shoe to said position below said trolley shoe in response to a predetermined angular movement of said trolley shoe about said second axis;
   (f) yieldably resilient means interposed between said support and said pole for biasing said pole into upward pivotal movement of said other terminal portion away from said support;
   (g) operating means for pivotally lowering said other terminal portion toward said support against the restraint of said yieldably resilient means, said operating means including a motor-driven operating member movable on said support; and
   (h) motion transmitting means connecting said operating member to said guide member for moving said guide member from said position below said trolley shoe to said position above said trolley shoe in response to said lowering of said other terminal portion by said operating means.

2. An arrangement as set forth in claim 1, wherein said operating member is rotatably mounted on said support and abuttingly engages said pole for moving the pole against said restraint.

3. An arrangement as set forth in claim 2, wherein said motion transmitting means includes a tension member.

4. An arrangement as set forth in claim 3, wherein said motion transmitting means further include a two-armed lever mounted on said support, one of the arms of said lever being operatively connected to said operating member, the other arm being connected to said guide member by said tension member.

5. An arrangement as set forth in claim 4, wherein said motion transmitting means further include a helical tension spring connecting said operating member to said one arm.

6. An arrangement as set forth in claim 4, wherein said motion transmitting means further include a helical tension spring tandem-connected with said tension member between said other arm and said guide member.

7. An arrangement as set forth in claim 4, wherein said pole is tubular, and a portion of said tension member is movably received in said pole.

* * * * *